United States Patent [19]
Boillat

[11] Patent Number: 4,791,345
[45] Date of Patent: Dec. 13, 1988

[54] DRIVING DEVICE FOR A STEPPING MOTOR

[75] Inventor: Pierre Boillat, Meyriez, Switzerland

[73] Assignee: LGZ Landis & Gyr Zug AG, Zug, Switzerland

[21] Appl. No.: 82,645

[22] Filed: Aug. 6, 1987

[30] Foreign Application Priority Data

Aug. 20, 1986 [CH] Switzerland ............... 03334/86

[51] Int. Cl.$^4$ .................................... H02P 8/00
[52] U.S. Cl. ................................. 318/696; 318/685
[58] Field of Search ........................... 318/696, 685

[56] References Cited

U.S. PATENT DOCUMENTS

| | | | | |
|---|---|---|---|---|
| 4,119,901 | 10/1978 | Leenhouts | | 318/685 |
| 4,119,902 | 10/1978 | Newell | | 318/696 |
| 4,489,260 | 12/1984 | Matsushita | | 318/696 |
| 4,673,855 | 6/1987 | Boillat | | 318/696 |
| 4,683,409 | 7/1987 | Boillat | | 318/696 |

FOREIGN PATENT DOCUMENTS 3444220 5/1986 Fed. Rep. of Germany.
2166609 5/1986 United Kingdom.

OTHER PUBLICATIONS

Search Report, European Patent Office, Mar. 27, 1987.

*Primary Examiner*—William M. Shoop, Jr.
*Assistant Examiner*—Saul M. Bergmann
*Attorney, Agent, or Firm*—Marmorek, Guttman & Rubenstein

[57] ABSTRACT

A driving device for controlling the driving frequency for a stepping motor includes a voltage control pulse generator for producing electrical pulses for driving the stepping motor. The pulse generator includes an RC network providing a time base for the pulse width and the operating frequency of the electrical pulses. The RC network includes at least one controllable resistance and a capacitor connected to control the controllable resistance by the charging and discharging of the capacitor.

11 Claims, 3 Drawing Sheets

4,791,345

DRIVING DEVICE FOR A STEPPING MOTOR

FIELD OF THE INVENTION

The invention relates to a driving device for a stepping motor and particularly to a driving device operable to produce electrical pulses at a variable frequency to eliminate instabilities in the stepping motor during changes in the speed of the stepping motor.

BACKGROUND OF THE INVENTION

Generally, a stepping motor produces discrete angular movements of substantially uniform magnitude in response to electrical pulses rather than continuous rotation. It is known that stepping motors can have instabilities during changes in the driving frequency. German Patent DE No. 34 44 220 A1 (corresponding to U.S. Pat. Nos. 4,683,409 and 4,673,855) at FIG. 1 shows a driving device for a stepping motor used to compensate for instabilities in the stepping motor.

The driving device disclosed in the German patent includes a voltage controlled pulse generator for producing rectangular electrical pulses at a variable frequency. The electrical pulses are filtered and in one embodiment amplified to produce a voltage signal. This voltage signal has a source resistance based on an electrical current representing the sum of the phase electrical currents of the stepping motor. The pulse generator is an astable multivibrator including a timer of the type commercially available as a LM 556 timer. The multivibrator includes an RC network for controlling the time basis of the duration of each electrical pulse, pulse width, and the time period between consecutive electrical pulses, the pulse frequency.

SUMMARY OF THE INVENTION

It is an object of the invention to provide a driving device for operating a stepping motor in which the driving device does not produce sudden changes in the frequency of the electrical pulses driving the stepping motor. Instead, the driving device according to the invention provides steady and continuous changes in the frequency of the electrical pulses driving the stepping motor so that a corresponding steady and continuous change in the speed of the stepping motor occurs.

In one embodiment, the driving device according to the invention includes a voltage controlled pulse generator including a RC network for determining the electrical pulse duration and the frequency of the electrical pulses. The RC network includes at least one controllable resistance controlled by the charging and discharging voltage of a capacitor. The controllable resistance can be in parallel with a fixed resistance.

BRIEF DESCRIPTION OF THE DRAWINGS

Examples of embodiments according to the invention are described herein in further detail in connection with the drawings in which.

Identical reference numerals designate identical parts in all of the figures of the drawings.

DESCRIPTION OF THE INVENTION

Figure 1:
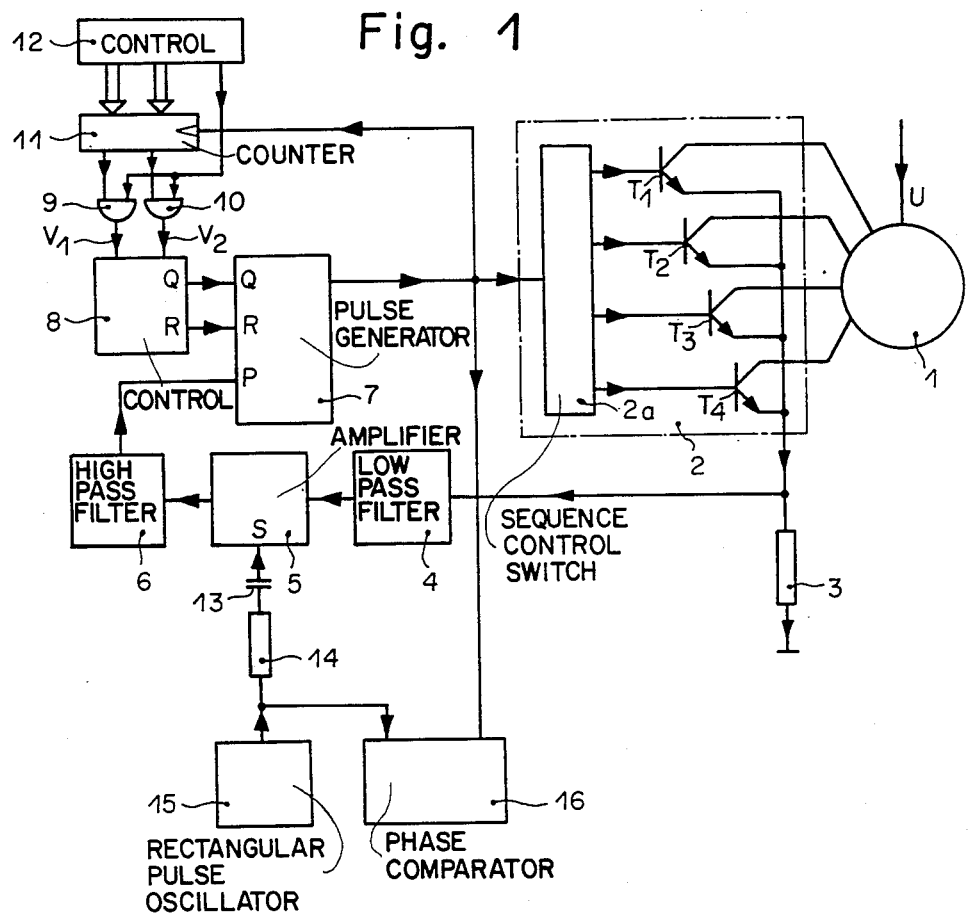
FIG. 1 is a block diagram of a driving device according to the invention.

FIG. 1 shows a block diagram of a driving device according to the invention connected to a stepping motor 1 which receives electrical power from a direct electrical current U. The stepping motor 1 can have any number of phases. As shown in FIG. 1, the stepping motor 1 is a four-phase stepping motor. Accordingly, sequence indicator 2 is provided with four output terminals connected to the stepping motor 1.

The output terminals of the sequence indicator 2 correspond to the collectors of bi-polar transistors $T_1$, $T_2$, $T_3$ and $T_4$. Suitable bi-polar transistors are readily available commercially. The bases of each of the bi-polar transistors $T_1$, $T_2$, $T_3$ and $T_4$ are connected to a sequence control switch $2a$ and the input of the respective bi-polar transistors correspond to the input terminals of the sequence indicator 2. The emitters of the bi-polar polar transistors $T_1$, $T_2$, $T_3$ and $T_4$ can be connected to each other within the sequence indicator 2.

The output terminals of the bi-polar transistors $T_1$, $T_2$, $T_3$ and $T_4$ not connected to the direct electrical current U can be grounded. As shown in FIG. 1, the emitters of the bi-polar transistors are connected to a precision resistor 3 which is grounded. In addition, the emitters are connected to a low pass filter 4.

The output of the low pass filter 4 is connected to the input of an amplifier 5 if the amplifier 5 is used. Otherwise, the output of the low pass filter 4 is connected to the input of a high pass filter 6. The output of the amplifier 5 as shown in FIG. 1 is connected to the input of the high pass filter 6.

The output of the high pass filter 6 is connected to the voltage control input P of a voltage controlled pulse generator 7. The output of the pulse generator 7 is connected to the input of the sequence indicator 2, to a pulse input of a countdown counting device 11 and, if included, to one input of a phase comparator 16.

Each terminal of a bi-polar output of a control device 8 is connected to the respective input terminals Q and R of a bi-polar resistance input of the pulse generator 7. Each output of the AND-gates 9 and 10 is connected to drive inputs of the control device 8. The control device 8 controls the increase and decrease of the operating frequency of the pulse generator 7. Each of the outputs of the countdown counting device 11 is connected to one input of the respective AND-gates 9 and 10.

One output of a control device 12 is connected to the second input of the respective AND-gates 9 and 10. One output of a quartz controlled rectangular pulse oscillator 15, if included, is connected to a second input, if included, of a phase comparator 16 and to a synchronous input S of an amplifier 5 through a series connection of a capacitor 13 and a resistance 14.

A bus connection directly connects each first and each second multibit output of the control device 12. The control device 12 has a digital operation to produce first and second multibit input signals to the countdown counting device 12.

The pulse generator 7 is a voltage controlled rectangular pulse generator capable of being varied by a voltage. Such generators are known in the art and can be constructed using an astable multivibrator such as a timer commercially marketed as LM 556 by National Semiconductor Corp., 2900 Semiconductor Drive, Santa Clara, Calif. 95051 and described by that company in their book "Linear Databook", 1978 and their book entitled "Linear Applications Handbook", 1978.

The low pass filter 4 and the high pass filter 6 can be designed using conventional technology such as L type RC networks. For the low pass filter 4, a resistance is positioned in a long branch and a capacitor is positioned in a cross branch. For the high pass filter 6, the resistance and capacitor are reversed so that the capacitor is positioned in a long branch and the resistance is positioned in a cross branch. In an elementary circuit, the high pass filter includes a single capacitor. In the absence of the amplifier 5, the high pass filter 6 can be combined with the low pass filter 4 in a cascade connection to produce a band pass filter.

The control device 12 can be a microcomputer. The countdown counting device 11 includes two conventional binary computers (not shown) each having a decoder connected downstream in a conventional manner.

Figure 2:
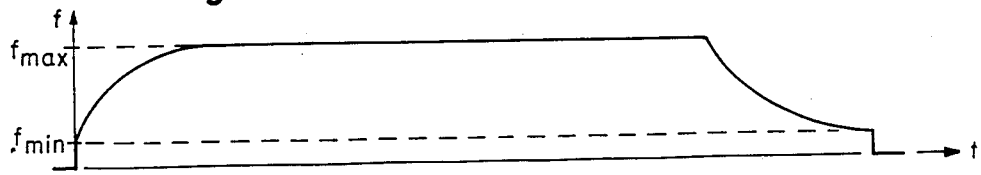
FIG. 2 is a graph of pulse frequency versus time for the driving device shown in FIG. 1.
Figure 3:
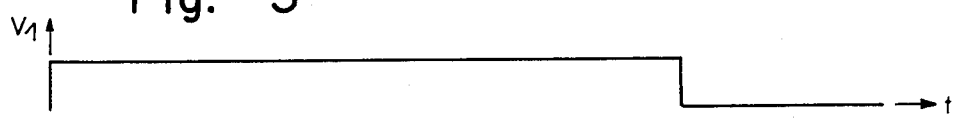
FIG. 3 is a graph of starting drive voltage $V_1$ versus time for the driving device shown in FIG. 1.
Figure 4:
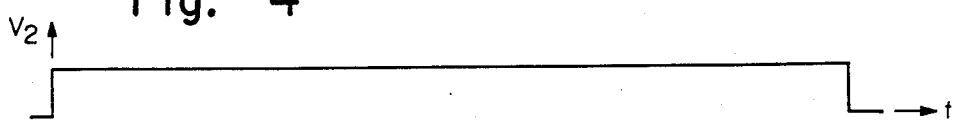
FIG. 4 is a graph of the release drive voltage $V_2$ versus time for the driving device shown in FIG. 1.

The frequency f of the rectangular electrical pulses produced by the pulse generator 7 varies in time in accordance with the graph shown in FIG. 2. For the same time period, the drive control signal $V_1$ and the output signal $V_2$ of the respective AND-gates 9 and 10 are shown in FIGS. 3 and 4, respectively.

Figure 5:
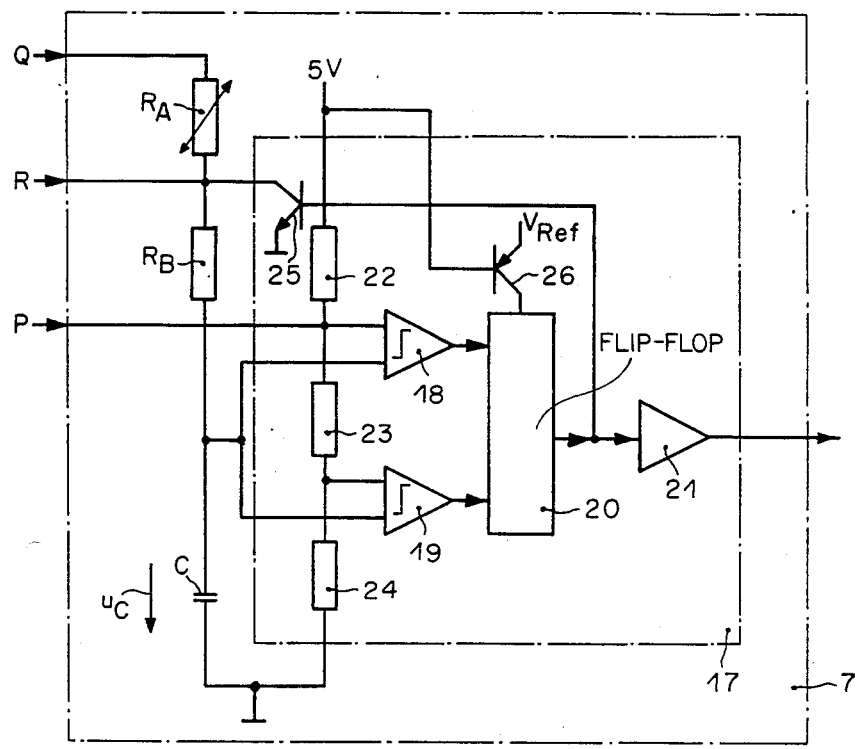
FIG. 5 is a block diagram of an embodiment of the voltage controlled pulse generator shown in FIG. 1.

FIG. 5 shows a block diagram of one embodiment of the pulse generator 7. Timer 17 includes a first comparator 18, a second comparator 19, a flip-flop 20, an amplifier 21, resistances 22, 23 and 24 connected in series, a transistor 25 and a transistor 26.

The timer 17 is connected to a capacitor C and resistances $R_A$ and $R_B$. Preferably, the resistance $R_A$ is a variable resistance. The flip-flop 20 can be a commercially available RS flip-flop. The transistors 25 and 26 are of opposite conductivity type and can be bi-polar transistors. For example, transistor 25 can be an NPN transistor while the transistor 26 is a PNP transistor.

As shown in FIG. 5, the voltage control input P of the pulse generator 7 is connected to a common terminal of resistances 22 and 23 along with one input to the comparator 19. The second input of the comparator 18 and one input of the comparator 19 are connected to a common terminal of resistance $R_B$ and capacitor C. The remaining terminal of the resistance 24 and of the capacitor C are grounded along with the emitter of the transistor 25. The other terminal of the resistance 22 and the base of the transistor 26 are connected to a voltage supply such as a 5 volt direct electrical current source.

The output of the comparators 18 and 19 are connected to the input of the flip-flop 20. The output of the flip-flop 20 is connected to the input of the amplifier 21 and the base of the transistor 25. The collector of the transistor 26 is connected to a reset input of the flip-flop 20 while the emitter of the transistor 26 is connected to a direct current reference voltage $V_{Ref}$. The output of the amplifier 21 is the output of the timer 17 as well as the output of the pulse generator 7. The collector of the transistor 25 is connected to the terminal common to the resistances $R_A$ and $R_B$. The terminals of the resistance $R_A$ constitute the bi-polar resistance input Q and R of the pulse generator 7.

Figure 6:
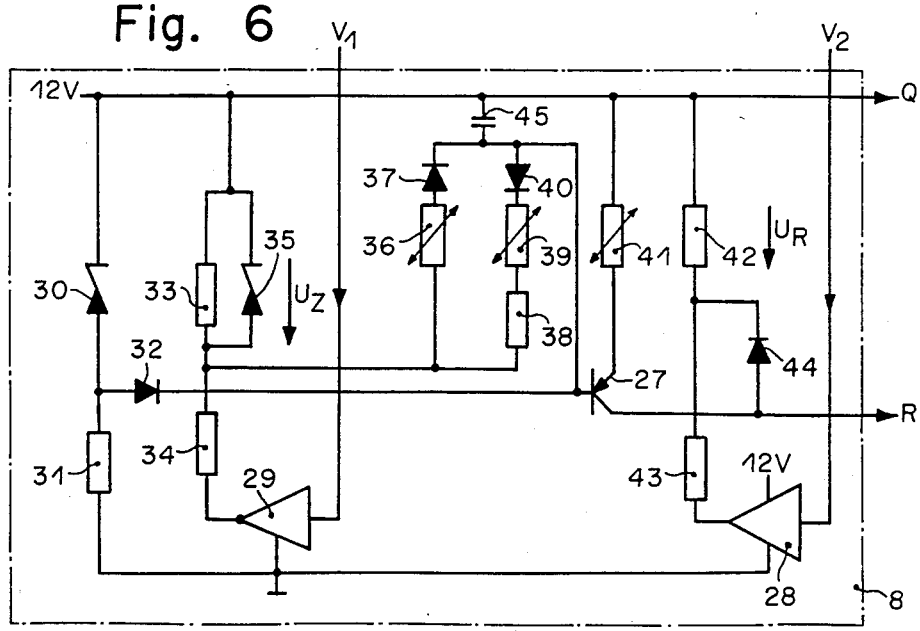
FIG. 6 is a circuit diagram of the control device shown in FIG. 1.

FIG. 6 shows a circuit arrangement suitable for the control device 8. The inputs to amplifiers 28 and 29 constitute the control inputs of the control device 8 to which the output signals $V_1$ and $V_2$ of the respective AND-gates 9 and 10 are connected. The output of an inverting amplifier 29 is connected through a resistance 34 to one terminal of a resistance 33, to a series connection of a resistance 36 and diode 37, and to a series connection of resistance 38, resistance 39 and diode 40. In addition, the resistance 34 is connected to the anode of a Zener diode 35. The cathode of the diode 37 is connected to a capacitor 45 and to the anode of the diode 40.

The capacitor 45 is connected to the base of transistor 27. The emitter of the transistor 27 is connected through a variable resistance 41 to a 12 volt direct electrical current while the collector of the transistor 27 is connected to the anode of a diode 44. The anode of the diode 44 constitutes one of the outputs of the control device 8. A cathode of the diode 44 is connected to resistances 42 and 43. The other terminal of the resistance 42 is connected to one side of the 12 volt direct electrical current source while the other terminal of the resistance 43 is connected to the other side of the 12 volt direct electrical current source through the non-inverting amplifier 28. The resistances 42 and 43 form a voltage divider 42;43.

The 12 volt direct electrical current is also connected to Zener diodes 30 and 35, the resistance 33, the capacitor 45 and the positive terminal of the non-inverting amplifier 28. The anode of the Zener diode is connected to the anode of the diode 32 and to a terminal of a resistor 31. The other terminal of the resistor 31 is grounded. The negative terminals of the amplifier 28 and 29 are also grounded.

Figure 7:
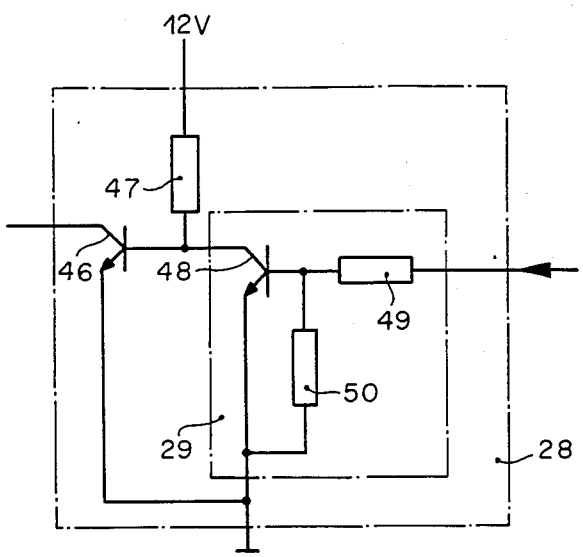
FIG. 7 is a circuit diagram of the non-inverting control amplifier shown in FIG. 6.

One embodiment of the non-inverting control amplifier 28 is shown in FIG. 7. FIG. 7 shows a circuit which can be used for control amplifier 28. The control amplifier 28 includes an inverting control amplifier 29, transistor 46 and resistance 47. The output of the inverting control amplifier 29 is connected to one terminal of resistance 47 and to the base of the transistor 46. The collector of the transistor 46 constitutes the input of the control amplifier 28. The resistor 47 is connected to a positive voltage source while the emitter of the transistor 46 is connected to a negative voltage source. The collector of the transistor 46 is connected to the output of the control amplifier 28.

The control amplifier 29 is part of the control device 8 and is similar in design to a control amplifier 28. The control amplifier 29 includes transistor 48, and resistors 49 and 50 connected in series with a common terminal connected to the base of the transistor 48. The resistor 49 represents the input to the control device 8 while the collector of the transistor 46 constitutes the output of the control device 8. The emitter of transistor 48 is the negative feed terminal of the control amplifier 29 while the resistance 50 is connected to the emitter of the transistor 48.

The amplifier 28 shown in FIG. 7 includes the control amplifier 29, a transistor 46 and a resistance 47. The output of the control amplifier 29 is connected to one terminal of resistance 47 and the base of the transistor 46. The input of the control amplifier 29 is also the input of the control amplifier 28. One terminal of the resistance 47 is connected to a positive voltage oource while the emitter of the transistor 46 is connected to a negative voltage source. The collector of the transistor 46 is connected to the output of the control amplifier 28.

The control amplifier 29 shown in FIG. 7 includes a transistor 48, and resistances 49 and 50. Common terminals of the resistances 49 and 50 are connected to the base of the transistor 48. The other terminal of the resistor 49 constitutes the input of the control amplifier 29 while the collector of the transistor 48 constitutes the output of the control amplifier 29.

The emitter of the transistor 48 is connected to a negative feed terminal of the control amplifier 29 while the other terminal of the resistance 50 is connected to the emitter of the transistor 48. As shown in FIG. 7, the negative feed terminal of the control amplifier 29 is connected to the control amplifier 28. The transistors 46 and 48 operate together to constitute an open collector output of the control amplifier 28 for the control amplifier 29. The transistors 46 and 48 can be bi-polar NPN transistors.

Figure 8:
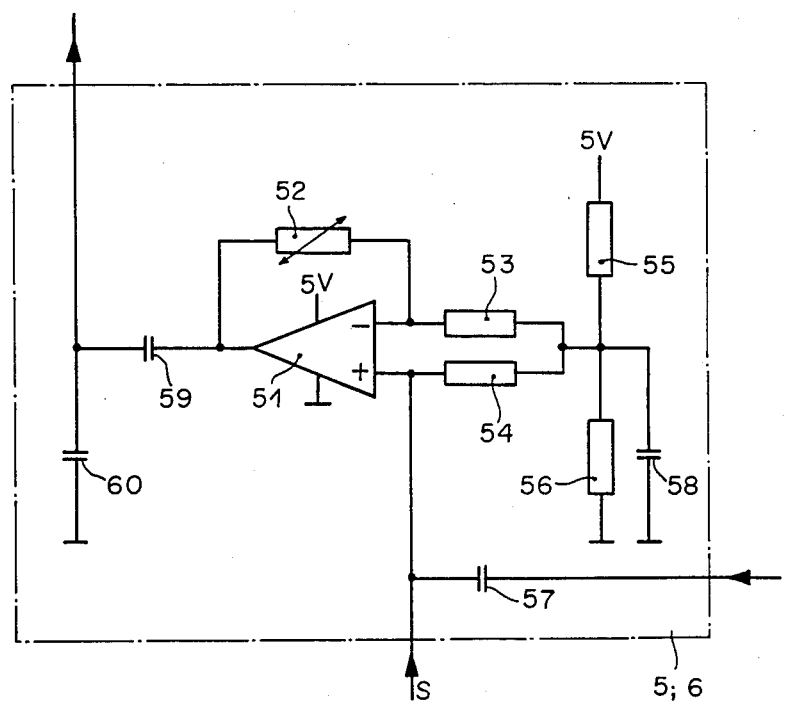
FIG. 8 is a circuit diagram of the amplifier and high pass filter shown in FIG. 1.

FIG. 8 shows an embodiment of the amplifier 5 and the high pass filter 6 in cascade connection. An operational amplifier 51 is connected to resistances 52, 53, 54, 55 and 56 and is connected to capacitors 57, 58, 59 and 60. The capacitors 59 and 60 constitute a series connection. The synchronous input S of the amplifier 5 corresponds to the input of the cascade connection 5;6 and is connected to the capacitor 57 as well as the non-inverting input of the operational amplifier 51 and one terminal of the resistance 54. The other terminal of the resistance 54 is connected to each of the terminals of the capacitor 58 and resistances 53, 55 and 56.

The resistances 52 and 53 are in series connection with each other and the resistance 53 is connected to the inverting input of the operational amplifier 51. The output of the operational amplifier 51 is connected to the resistance 52 and to the series connection of the capacitors 59 and 60. The resistance 56, capacitor 58, series connection of the capacitors 59 and 60, and the negative feed terminal of the operational amplifier 51 are grounded. A 5 volt direct electrical current is connected to the positive feed terminal of the operational amplifier 51 and to a terminal of the resistance 55. Preferably, the resistance 52 is a variable resistance.

In stepping motors, a sudden loss in torque can occur at high rotational speeds within certain drive frequency ranges. As a result, the stepping motor can lose synchronism with the driving device and come to a stop. While no limitation is intended, this phenomena can be explained by parametric resonances of the stepping motor because the rotor of the stepping motor oscillates in addition to maintaining its constant angular velocity. The amplitude of such oscillations are more likely to increase greatly within certain critical driving frequency ranges. The oscillations can become sufficiently strong so that the stepping motor loses synchronism and eventually stops rotating.

In the absence of stabilization, a graph of the torque of the stepping motor versus driving frequency shows theoretical thrusts within a driving frequency range from about zero to about 20 kHz. In practice, at least one thrust could be reached at about 1,000 steps per second in the so-called "pull-out" range. Thus, in the absence of stabilization, the stepping motor would be operated at relatively low speeds, less than about 100 steps per second. At such operating speeds, a stepping motor has a low mechanical capacity and its performance is poor.

The aforementioned German patent DE No. 34 44 220 A1 has a circuit design having some similarity to the instant FIG. 1. The differences appearing in the instant FIG. 1 include the optional arrangement of the components 13, 14, 15 and 16 and the arrangement of the components 8, 9, 10, 11 and 12 for triggering the pulse generator 7.

A voltage at the resistance 3 acts through low pass filter 4, amplifier, and high pass filter 6 to vary the frequency of the rectangular electrical pulses produced by the pulse generator 7. This enables the opertion of the stepping motor 1 to be stable even in the "pull-out" range. For this purpose, the pulse generator 7 can include a voltage controlled astable multivibrator as shown in FIG. 5 with at least one capacitor C periodically charging and discharging through resistances so that its capacitor voltage $u_C$ follows a saw-tooth amplitude variation in time.

For the circuit shown in FIG. 5, the 12 volt direct electrical current occurring at the input terminal Q charges the capacitor C through the series connection of resistances $R_A$ and $R_B$. The capacitor voltage $u_C$ reaches a threshold value in the comparator 18 as determined by resistances 22, 23, and 24 which are connected to form voltage dividers. Thereafter, the comparator 18 reverses the flip-flop 20. The transistor 25 becomes conductive and the capacitor C discharges through resistance $R_B$ and the collector/emitter path of the transistor 25.

When the capacitor voltage $u_C$ is below a predetermined threshold value of the comparator 19, as determined by the resistances 22, 23 and 24, the comparator 19 switches the flip-flop 20 back into its original state so that the transistor 25 is clamped and the capacitor C can again be charged through the series connection of the resistances $R_A$ and $R_B$. Any voltage signal occurring at the output of the high pass filter 6 as shown in FIG. 1 adjusts and varies the threshold value of the comparator 18 through the voltage control input P of the pulse generator 7 as shown in FIG. 5. This results in the frequency of the rectangular output pulses of the flip-flop 20 to be varied.

Additional steps can be taken to guard against the risk of an operating instability of the stepping motor 1. If the operating frequency of the stepping motor 1 includes frequencies in the "pull-out" range, the operation of the pulse generator is made so that the drive cannot be suddenly switched off. Instead, the driving frequency of the stepping motor 1 is changed steadily and continuously either during switching on or switching off of the stepping motor 1.

In operation, the stepping motor 1 is increased until a predetermined maximum driving frequency of $f_{max}$ is reached. If the stepping motor 1 is already operating up to the driving frequency of $f_{max}$, the driving frequency is steadily and continuously decreased until a predetermined minimum driving frequency of $f_{min}$ is reached outside the "pull-out" range.

FIG. 2 shows an ideal time curve for starting and stopping the stepping motor 1 in the driving frequency range of $f_{min}$ to $f_{max}$. In operation, the starting motor 1 starts from non-rotation or zero frequency and rises rapidly to the frequency $f_{min}$ which is outside the "pull-out" range. Thereafter, the driving frequency increases steadily and continuously, preferably exponentially to the operating driving frequency of $f_{max}$. The operating driving frequency $f_{max}$ can be within the "pull-out" range. Reduction of the driving frequency is also carried out steadily and continuously, preferably exponentially from $f_{max}$ to $f_{min}$. From $f_{min}$ to zero, the change can be carried out abruptly. The changes in the driving frequency shown in FIG. 2 can be carried out with the herein described control device 8.

Referring to FIG. 6, the transistor 27 and resistance 41 of the control device 8 represent a controlling resistance 27;41 having a value equal to the sum of the value of the resistance 41 and the resistance value of the collector-emitter path of the transistor 27 which can be modified by the voltage on the base of the transistor 27. The value of the controllable resistance 27;41 is controlled by the charging and discharging voltage of the capacitor 45. The controllable resistance 27;41 is connected in parallel to output terminals Q and R to the resistance input Q and R of the pulse generator 7 as well as its resistance $R_A$.

The effective value of the resistance $R_A$ connected in series with the resistance $R_B$ shown in FIG. 5 affects the charging curve of the capacitor C of the pulse generator 7 by altering the base voltage of the transistor 27. This changes the slope of the positively directed sides of the saw-tooth shaped voltage $u_C$ of the capacitor C and also the driving frequency of the stepping motor 1.

In FIG. 4, the release control signal $V_2$ of the stepping motor 1 is equal to the logic value "1" during the operation of each starting period of the stepping motor 1. Outside the starting period, the binary release control signal $V_2$ and the output signal of the control amplifier 28 which it produces each have a logic value of "0". This makes the diode 44 conductive because it is clamped so that the voltage of the input terminal R of the pulse generator 7 as shown in FIG. 5 and is maintained constant at a low level. This takes the astable multivibrator of the pulse generator 7 out of its operation and the operating frequency of the pulse generator 7 becomes zero. As soon as the binary release control signal $V_2$ becomes the logic value of "1", the output voltage of the control amplifier 28 increases to 12 volts and the diode 44 is no longer conductive, thereby releasing the astable multivibrator of the pulse generator 7.

A binary starting voltage signal $V_1$ of the stepping motor 1 is shown in FIG. 3. Along with the release control signal $V_2$, the voltage signal $V_1$ assumes a logic value of "1". The previous logic value was "0" resulting in the output signal of the control amplifier 29 being triggered by the starting control signal $V_1$. The output of the control amplifier 29 is wired as an open collector so that the capacitor 45 is able to discharge completely down to zero volts through resistors 33 and 36 via a diode 37. The voltage of the capacitor 45 acts directly on the base of the transistor 27 to clamp the transistor 27 at the starting period, thereby removing the controllable resistance 27;41 from the operation.

The capacitor C of the pulse generator 7 shown in FIG. 5 is charged through resistances $R_A$ and $R_B$. Since resistance $R_A$ is not shunted in the case at hand, $R_A$ attains its maximum effective value in the RC product. As a result, the charging time of the capacitor C is its maximum and the output frequency f of the pulse generator 7 is minimal, the frequency is equal to $f_{min}$.

Accordingly, at the beginning of a starting period for the stepping motor 1, the control signals $V_1$ and $V_2$ have logic values of "1" and the operating frequency f of the pulse generator 7 rapidly changes from zero to $f_{min}$. An acceptable value for the frequency $f_{min}$ can be predetermined by adjusting the resistance $R_A$ to a value below the "pull-out" range of the stepping motor 1.

As soon as the starting control signal $V_1$ takes a logic value of "1", a logic value of "0" appears at the output of the control amplifier 29. The resistances 33 and 34 function as a voltage divider 33;34 and the Zener value 35 connected in parallel to the resistor 33 limits its output voltage $u_Z$ to about 6.2 volts for a 12 volt power line and the Zener diode 35 selected to be a 6.2 volt Zener diode.

The capacitor 45 is charged exponentially through the resistance/diode series connection 38;39;40 from about zero volts to about $-6.2$ volts. The voltage at the base of the transistor 27 decreases exponentially from about 12 volts to about 5.8 volts so the transistor 27 becomes conductive. The controllable resistance 27;41 operates in parallel to the resistance $R_A$ as shown in FIG. 5. The effective value of the resistance $R_A$ is reduced so that the charging time of the capacitor C is reduced and the operating frequency of the pulse generator 7 increases exponentially from the frequency $f_{min}$ up to the maximum frequency of $f_{max}$. The maximum frequency of the $f_{max}$ can be determined by the variable resistance 41 and is reached when the voltage of the capacitor 45 has a value of about $-6.2$ volts.

At that time, the operating frequency f of the pulse generator 7, the drive frequency of the stepping motor 1, maintains a value of $f_{max}$ until the starting control signal $V_1$ is switched back to the logic value of "0". The time constant of the exponential increase of the control frequency f of the stepping motor 1 can be adjusted by means of the variable resistance 39.

If the starting control signal $V_1$ is set back to zero, the output signal of the control amplifier 29 takes a logic value of "1". The resistance 34 is taken out of operation and a capacitor 45 discharges exponentially through resistance 33 and the resistances/diode combination 36;37 from about $-6.2$ volts to about zero volts. The value of the resistance of the controllable resistance 27;41 decreases exponentially and the effective value of the resistance $R_A$ shown in FIG. 5 increases exponentially so that the drive frequency of the stepping motor 1 decreases exponentially from $f_{max}$ to $f_{min}$. When $f_{min}$ is reached, the voltage of the capacitor 45 reaches a value which maintains the transistor 27 and removes the controllable resistance 27;41 from the operation. The time constant of the exponential reduction of the drive frequency f of the stepping motor 1 can be adjusted by means of the variable resistance 36.

The charging and discharging voltage of the capacitor 45 in FIG. 6 is established through the direct electrical current $U_Z$ which can be reversed in value from about zero volts to about 6.2 volts or inversely from about volts to about $-6.2$ zero volts. This is accomplished through the resistance/diode series connection 36;37 or 38;39;40 at the output of the voltage divider 33;34. The reversible direct electrical current voltage $U_Z$ is produced through a connection between the input to the voltage divider 33;34 and the output of the control amplifier 29. The input of the control amplifier 29 is triggered by the binary starting control signal $V_1$.

The minimum value of $f_{min}$ of the control frequency of the stepping motor 1 is maintained until the release control signal $V_2$ is changed to its logic value "0". This places the diode 44 in operation and stops the astable multivibrator of the pulse generator 7 so that the drive frequency of the stepping motor 1 suddenly drops from $f_{min}$ to zero.

The following description briefly summarizes the operation of the invention. The release of the stepping motor 1 is effected by the direct electrical current voltage $U_R$ at the terminal of the variable resistor 27;41 through the diode 44 in FIG. 6. The voltage $U_R$ is reversible in value. The reversible direct current voltage $U_R$ is produced because the input terminal of the voltage divider 42;43 is connected to the output of the control amplifier 28 which in turn is triggered by the binary release control signal $V_2$.

The control arrangement 30;31;32 of the control device 8 shown in FIG. 6 is a limiter and is used as a safety precaution. It prevents the voltage at the base of the transistor 27 from becoming more negative than about 5.6 volts, such as in the case of a 12-volt source with the Zener diode 30 being a 5.6 volt Zener diode. The Zener diode 30 and the resistance 31 of the control arrangement 30;31;32 are connected as a voltage divider with the output connected through the diode 32 to the output of the control arrangement 30;31;32. The diode 32 functions as a clamping diode. The output of the control arrangement 30;31;32 is also connected to the control input of the variable resistance 27;41.

The starting control signals $V_1$ and $V_2$ are produced in the countdown counting device 11 as follows. The pulse duration of the starting control signal $V_1$ is expressed in digital form as a number of steps of the stepping motor 1. This digital information is loaded in parallel by the control device 12 into each of the countdown counters of the countdown counting device 11 through the two bus connections shown in FIG. 1.

As soon as the stepping motor 1 is to be started, a logic value of "1" appears at the output of the control device 12 and releases the two AND-gates 9 and 10 for each of the output signals of the countdown counting device 11. The countdown counting device 11 ordinarily has a logic value of "1". This corresponds to the beginning of a starting period of the drive frequency f.

At the end of the starting control signal $V_1$ stored in the countdown counter, a logic value of "0" appears at the appropriate output of the countdown counting device 11 to switch the starting control signal $V_1$ down to a logic value of "0" in cooperation with the AND-gate 9. This initiates the exponential reduction of the drive frequency f at the end of the starting period.

Similarly, a logic value of "0" appears at the end of the release control signal $V_2$ stored in the countdown counter at the appropriate output of the countdown counting device 11. This switches the release control signal $V_2$ in cooperation with the AND-gate 10 down to the logic value of "0" to initiate the sudden reversal of the drive frequency f from $f_{min}$ to zero at the end of the starting period.

The electrical pulses driving the stepping motor 1 can be advantageously frequency synchronized by the use of a quartz-controlled rectangular oscillator 15 through the RC network connection 13;14. The RC network connection 13;14 as shown in FIG. 1 changes the rectangular electrical pulses of the quartz-controlled rectangular oscillator 15 into a saw-tooth voltage which either supplies the amplifier 5 shown in FIG. 1 and FIG. 8 through the synchronization input S or, if such an amplifier is not provided, supplies the high pass filter 6 directly. This frequency synchronization causes a phase change of the drive frequency f of the stepping motor 1 during the period in which this frequency f is equal to the $f_{max}$.

Optionally, the pulse phase of the drive electrical pulses to the stepping motor 1 and the output signal of the quartz-controlled rectangular oscillator 15 can be compared to each other in a phase comparator 16 and their differences can be indicated in the comparator 16.

Finally, the above-described embodiments of the invention are intended to be illustrative only. Numerous alternative embodiments may be devised by those skilled in the art without departing from the spirit and scope of the following claims.

I claim:

1. A driving device for controlling the drive frequency for a stepping motor, comprising
   a voltage controlled pulse generator for producing electrical pulses having a pulse width and an operating frequency for driving said stepping motor;
   said pulse generator comprising an RC network providing a time base for the pulse width and the operating frequency of said electrical pulses; said RC network comprising at least one controllable resistance and a first capacitor; and
   a second capacitor coupled to said controllable resistance; said controllable resistance being controlled by the charging and discharging of said second capacitor.

2. The driving device as claimed in claim 1, further comprising a first resistance/diode series connection connected to one terminal of said second capacitor; a second resistance/diode series connection connected to the one terminal of said second capacitor; and a reversible direct electrical current source connected to the other terminal of said second capacitor; whereby charging and discharging voltages can be obtained on said capacitor.

3. The driving device as claimed in claim 2, wherein each resistance/diode series connection includes at least one adjustable resistance.

4. The driving device as claimed in claim 2, further comprising at least one voltage divider for providing said reversible direct electrical current; and a drive amplifier operable to be triggered by a starting drive signal from said stepping motor and coupled to said voltage divider.

5. The driving device as claimed in claim 3, further comprising at least one voltage divider for providing said reversible direct electrical current; and a drive amplifier operable to be triggered by a starting drive signal from said stepping motor and coupled to said voltage divider.

6. The driving device as claimed in claim 5, further comprising a Zener diode connected in parallel to a resistance forming a part of said voltage divider.

7. The driving device as claimed in one of the claims 1–6, further comprising a diode coupled to said controllable resistance and a second reversible direct electrical current coupled to said controllable resistance through said diode.

8. The driving device as claimed in claim 7, further comprising at least one second voltage divider for providing said second reversible direct electrical current; and a second control amplifier operable to be triggered by a releasing control signal from said stepping motor and coupled to an input terminal of said second voltage divider.

9. The driving device as claimed in one of the claims 1–6, further comprising a limiter coupled to the control input of said controllable resistance.

10. The driving device as claimed in claim 9, wherein said limiter comprises at least one Zener diode and one resistance; and means to couple a common terminal of said Zener diode in said resistance to a further diode.

11. The driving device as claimed in one of the claims 1–6, further comprising a quartz-driven rectangular oscillator coupled to a second RC network for synchronizing the electrical pulses to said stepping motor.

* * * * *